(12) United States Patent
Carter

(10) Patent No.: US 6,728,127 B2
(45) Date of Patent: *Apr. 27, 2004

(54) SYSTEM MODULES WITH ATOMIC RESOLUTION STORAGE MEMORY

(75) Inventor: Timothy L. Carter, Caldwell, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/327,766

(22) Filed: Dec. 23, 2002

(65) Prior Publication Data

US 2003/0123275 A1 Jul. 3, 2003

Related U.S. Application Data

(63) Continuation of application No. 09/728,098, filed on Dec. 1, 2000, now Pat. No. 6,522,566.

(51) Int. Cl.[7] .............................................. G11C 13/00
(52) U.S. Cl. ...................... 365/118; 365/128; 365/151
(58) Field of Search ................................ 365/118, 128, 365/151, 52, 217; 269/100, 101

(56) References Cited

U.S. PATENT DOCUMENTS

| | | | | |
|---|---|---|---|---|
| 4,213,192 A | * | 7/1980 | Christensen, Sr. | 365/118 |
| 5,557,596 A | * | 9/1996 | Gibson et al. | 369/101 |
| 6,310,794 B1 | * | 10/2001 | Carter | 365/52 |

* cited by examiner

Primary Examiner—Connie C. Yoha

(57) ABSTRACT

Modules and processor-based systems are provided. One such module comprises: a first wafer having a storage medium, the storage medium having a plurality of storage areas, each of the storage areas being configurable in one of a plurality of structural states to represent information stored in the storage area; a second wafer arranged proximate the first wafer, the second wafer having a plurality of electron beam emitters configured to electrically communicate with the storage medium, said storage medium and said plurality of emitters being configured to move relative to each other such that each emitter may provide a beam of electrons to at least one of the storage areas of the storage medium, and logic circuitry configured to enable extraction of data from the storage areas of the storage medium and execution of instructions embodied within the data.

11 Claims, 5 Drawing Sheets

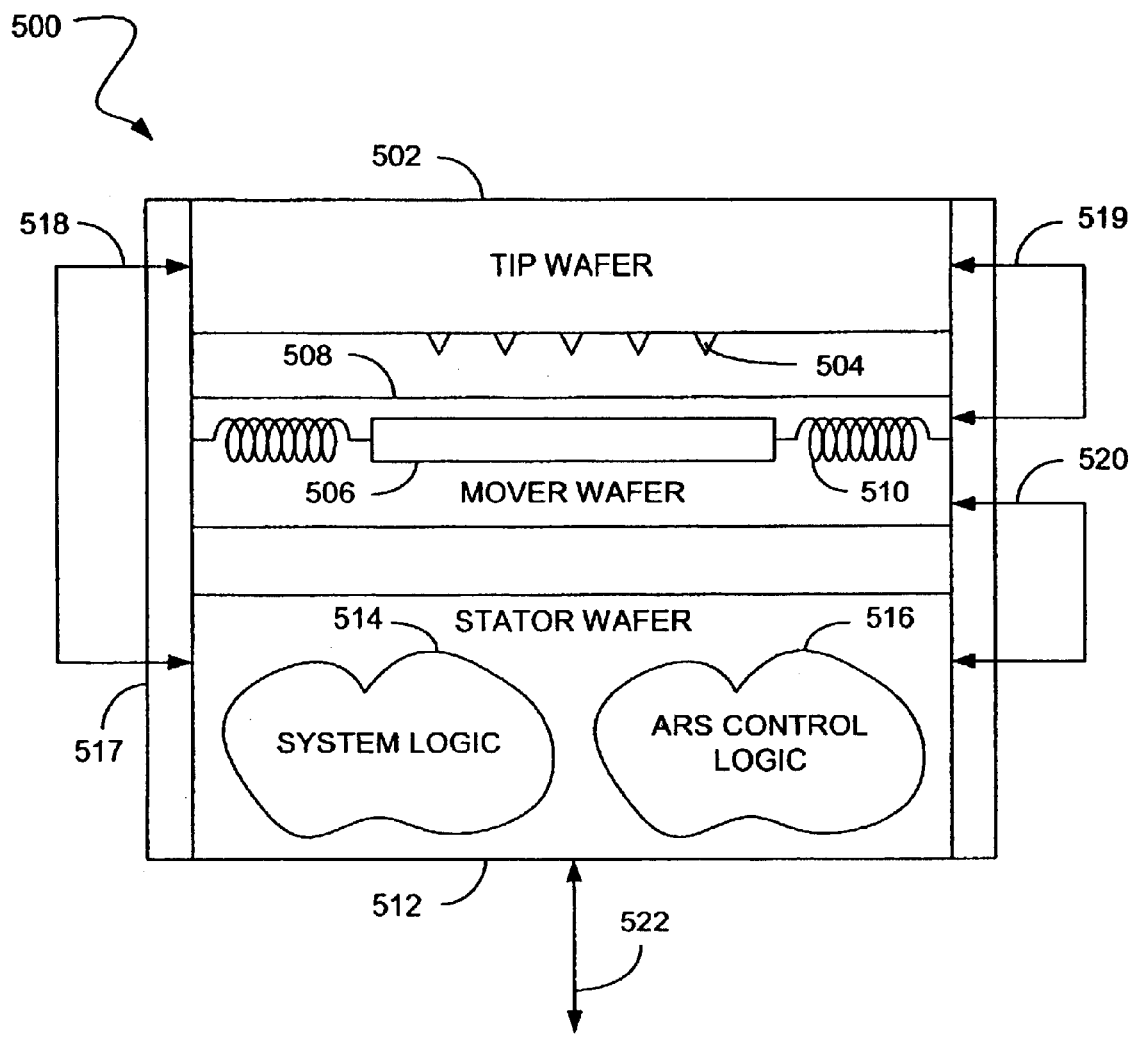

SYSTEM MODULES WITH ATOMIC RESOLUTION STORAGE MEMORY

CROSS REFERENCE TO RELATED APPLICATIONS

This application is a continuation application, which is based on and claims priority to U.S. Utility patent application Ser. No. 09/728,098, filed on Dec. 1, 2000 now U.S. Pat. No. 6,522,566, and which is incorporated herein in its entirety.

BACKGROUND OF THE INVENTION

1. Field of the Invention

The present invention generally relates to semiconductors and, more specifically, to semiconductor modules and systems employing atomic resolution storage (ARS) techniques.

2. Background of the Invention

Memory storage devices employing ARS technology include a number of electron field emitters that are adapted to write data to and read data from various storage areas of a storage medium. During operation, a predetermined potential difference is applied between a field emitter and a corresponding gate that extracts an electron beam current from the emitter towards the storage area. Writing of data from an emitter to a storage area is accomplished by temporarily increasing the power density of the electron beam current to modify the structural state of the surface of the storage area. In contrast, reading data from the storage area is accomplished by observing the effect of the storage area on the electron beam of the emitter, or the effect of the electron beam on the storage area. More specifically, reading typically is accomplished by collecting secondary and/or backscattered electrons when an electron beam, i.e., an electron beam with a lower power density than that of the electron beam utilized for writing data to the storage area, is applied to the storage medium.

An ARS storage medium is formed of material characterized by a structural state that can be changed from crystalline to amorphous by a beam of electrons. Since the amorphous state has a different secondary electron emission coefficient (SEEC) and backscattered electron coefficient (BEC) than the crystalline state, a different number of secondary and backscattered electrons are emitted from each storage area, in response to an electron beam, depending upon the current structural state of that storage area. Thus, by measuring the number of secondary and backscattered electrons, the structural state of the storage area and, therefore, the data stored by the storage area, may be determined.

Heretofore, a memory storage device, such as an ARS storage device, for example, that is to be utilized with a semiconductor device, such as a microprocessor, typically is provided as a separate or independent unit which is configured to electrically communicate with the microprocessor via various leads or interconnects. Thus, when a microprocessor and its associated memory storage device are to be provided in an arrangement on a circuit assembly, for example, such as on a surface of a printed circuit board (PCB), such an arrangement requires that both the microprocessor and the memory storage device each include a suitable surface for mounting to the PCB. During assembly, the microprocessor and the memory storage device are individually placed on and affixed to the PCB. Thereafter, the various leads or other interconnects for enabling electrical communication between the devices may be applied.

As may be readily apparent from the foregoing, assembly of such an arrangement of a microprocessor and a memory storage device suffers from inherent inefficiencies. Therefore, there is a need for improved devices, systems and methods that address these and other shortcomings of the prior art.

SUMMARY OF THE INVENTION

Briefly described, the present invention relates to semiconductors and, in particular, to semiconductor modules and systems employing atomic resolution storage (ARS) techniques. In this regard, an embodiment includes a module that comprises: a first wafer having a storage medium, the storage medium having a plurality of storage areas, each of the storage areas being configurable in one of a plurality of structural states to represent information stored in the storage area; a second wafer arranged proximate the first wafer, the second wafer having a plurality of electron beam emitters configured to electrically communicate with the storage medium, said storage medium and said plurality of emitters being configured to move relative to each other such that each emitter may provide a beam of electrons to at least one of the storage areas of the storage medium, and logic circuitry configured to enable extraction of, data from the storage areas of the storage medium and execution of instructions embodied within the data.

An alternative embodiment of the module includes means for storing information in one of a plurality of structural states and a wafer arranged proximate the means for storing information. The wafer includes logic circuitry configured to enable extraction of data from the means for storing information and execution of instructions embodied within the data.

Some embodiments may be construed as providing processor-based systems. One such embodiment includes a processor-based system comprising: a module having a first wafer and a second wafer, the first wafer having a storage medium, the storage medium having a plurality of storage areas, each of the storage areas configurable in one of a plurality of structural states to represent information stored in the storage area, the second wafer arranged proximate the first wafer, the second wafer having a plurality of electron beam emitters configured to electrically communicate with the storage medium, the storage medium and the plurality of emitters being configured to move relative to each other such that each emitter may provide a beam of electrons to at least one of the storage areas of the storage medium; and means for extracting data from the storage areas of the storage medium.

Other features and advantages of the present invention will become apparent to one with skill in the art upon examination of the following drawings and detailed description. It is intended that all such features and advantages be included herein within the scope of the present invention, as defined in the appended claims. Another embodiment of a system comprises: a module having a plurality of semiconductor wafers, the plurality of semiconductor wafers comprising a storage medium having a plurality of storage areas, each of the storage areas being configurable in one of a plurality of structural states to represent information stored in the storage area; a plurality of electron beam emitters configured to electrically communicate with the storage medium, the storage medium and the plurality of emitters being configured to move relative to each other such that each emitter may provide a beam of electrons to at least one of the storage areas of the storage medium; and logic circuitry operative to extract data from the storage areas of the storage medium.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention.

FIG. 5 is a schematic diagram illustrating a preferred embodiment of the present invention.

DETAILED DESCRIPTION OF A PREFERRED EMBODIMENT

Figure 1:
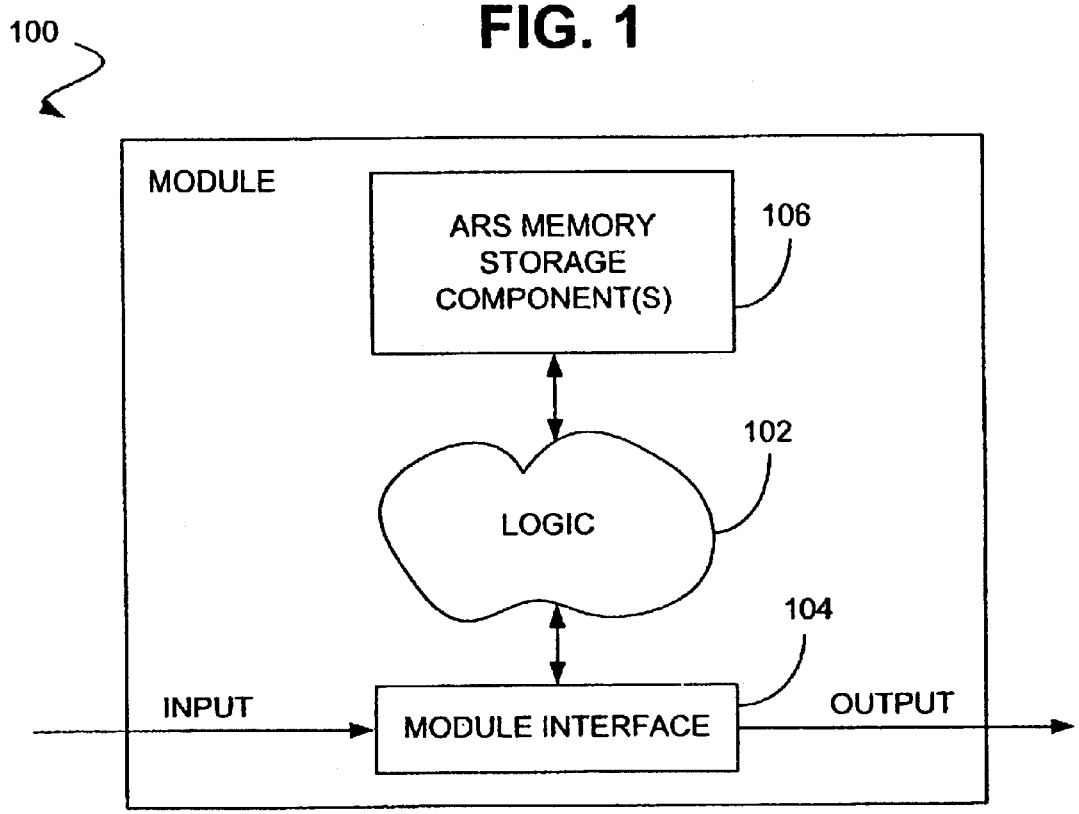
FIG. 1 is a block diagram of a preferred embodiment of the present invention.

Reference will now be made to the drawings wherein like numerals indicate corresponding parts throughout the several views. As shown in FIG. 1, a preferred embodiment of the system module 100 of the present invention includes logic 102 which is utilized for performing various logic functions of the module. Logic 102 may be provided in various configurations and may be adapted for providing functionality of virtually limitless applications depending upon the configuration utilized. For example, and not for the purpose of limitation, the logic may be configured to function as a microprocessor.

Logic 102 is communicatively coupled with a module interface 104 that facilitates communication of components internal to the module with components external to the module. Additionally, logic 102 is communicatively coupled with memory storage component(s) 106 for facilitating storage and retrieval of data, such as by utilizing ARS technology (representative examples of which are described in greater detail hereinafter).

Figure 2:
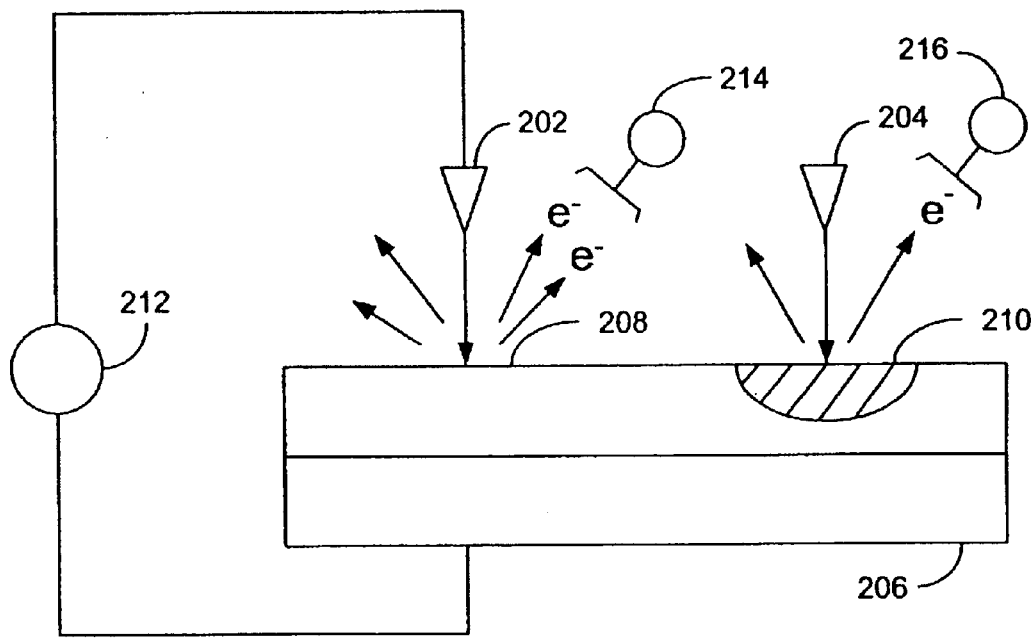
FIG. 2 is a schematic diagram depicting a representative memory storage device that may be utilized by the present invention.
Figure 3:
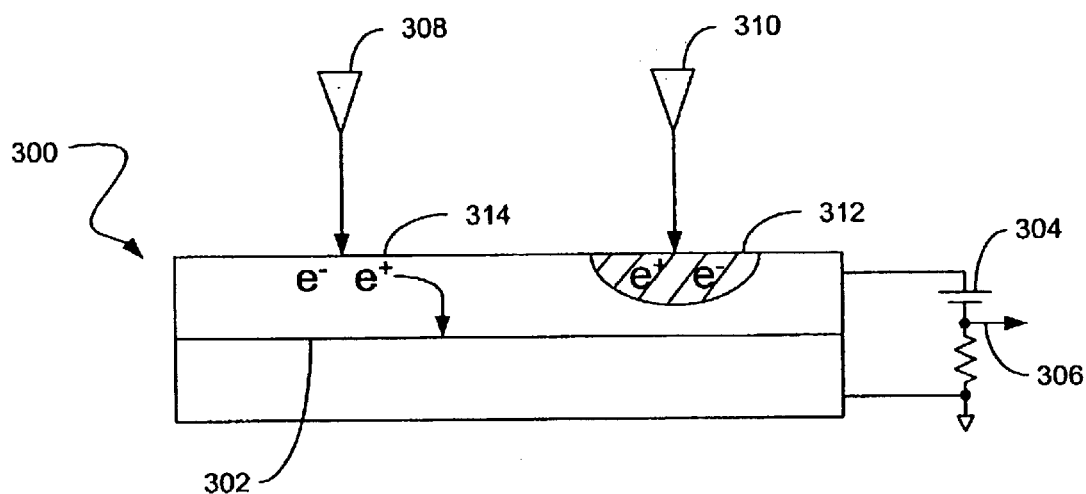
FIG. 3 is a schematic diagram depicting a representative memory storage device that may be utilized by the present invention.
Figure 4A:
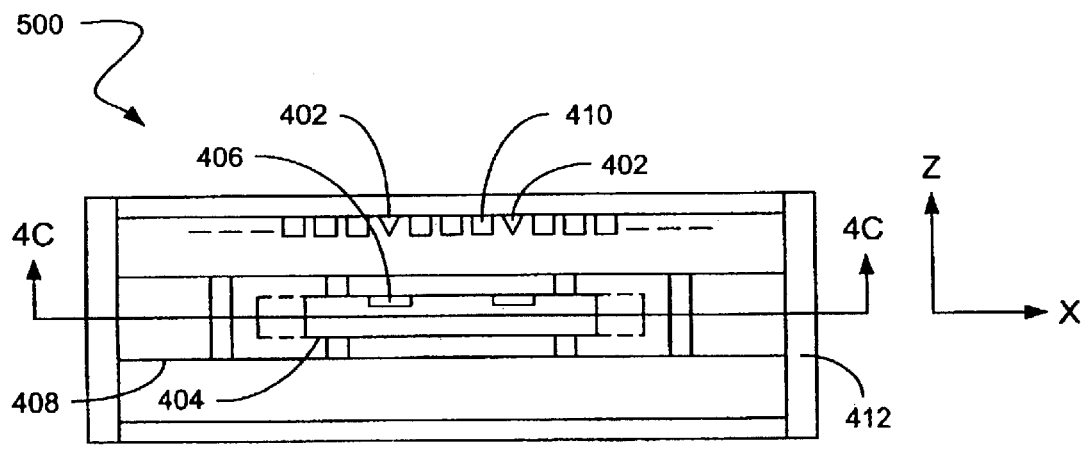
FIGS. 4A–4C are various views of a representative memory storage device which may be utilized with the present invention.
Figure 4B:
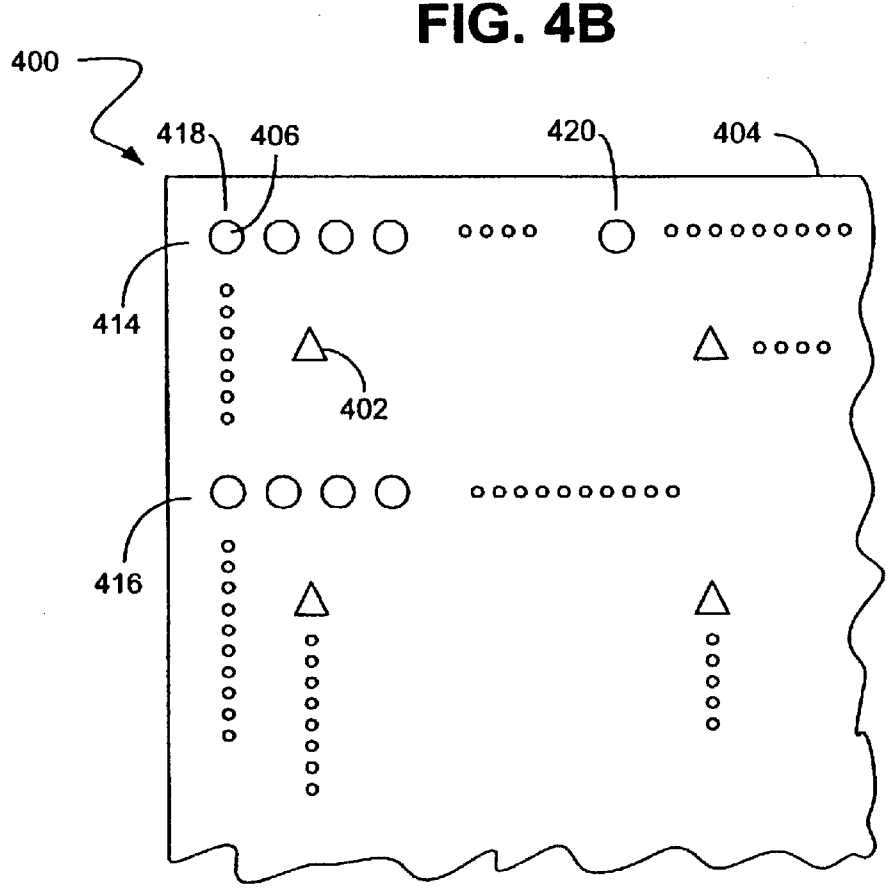
Figure 4C:
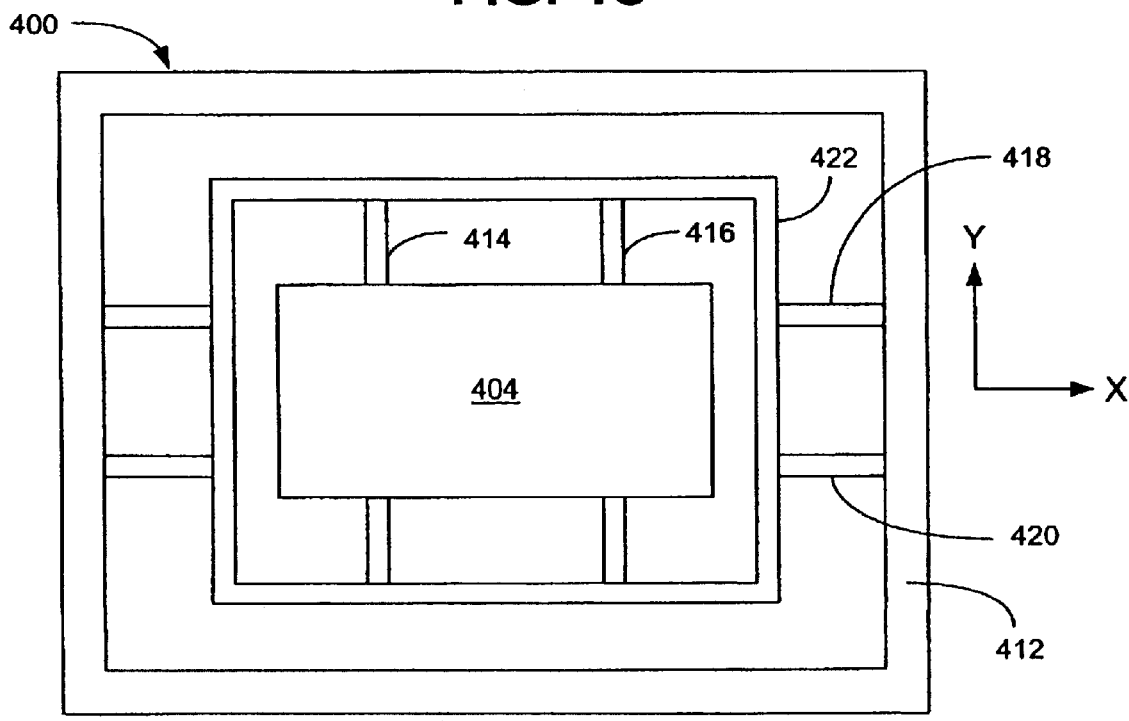

FIGS. 2 and 3 show representative ARS memory storage techniques. These figures, as well as FIGS. 4A through 4C, are disclosed and described in U.S. Pat. No. 5,557,596, which is hereby incorporated by reference in its entirety. It should be noted, however, that the ARS memory storage techniques shown and described herein are not the only ARS memory storage techniques capable of being utilized with the present invention; to the contrary, the present invention may be utilized with other types and configurations of ARS memory storage techniques provided that any such technique is capable of facilitating writing data to and reading data from a storage medium.

The schematic diagram of FIG. 2 depicts representative field emitters 202 and 204 reading from a storage medium 206. In particular, emitter 202 is reading from storage area 208 and emitter 204 is reading from storage area 210. Storage area 208 and storage area 210 are provided with different structural states, as described hereinbefore. When electrons, such as those provided by source 212, are extracted from the emitters and into the respective storage areas, a different number of secondary electrons and backscattered electrons may be detected relative to each storage area. Detection of the secondary and backscattered electrons may be accomplished by electron collectors 214 and 216. As utilized herein, the term "emitter" may be used to refer to both an emitter and/or an emitter and its associated collector). Thus, by monitoring the magnitude of a signal current collected by the electron collectors, the structural state of and, therefore, the data, i.e., bit, stored in the storage area may be identified. It should be noted that the difference in the number of secondary electrons and backscattered electrons collected from one storage area, as compared to a storage area having a different structural state, may be greater or lesser depending upon the type of material and the type of modification made to the material.

FIG. 3 schematically depicts an alternative technique for reading data from an ARS storage area. As shown, storage medium 300 is based on a diode structure, which may be a PN junction, a schottky barrier or any other type of electronic valve. Data is stored by locally altering the surface of the diode in such a way that collection efficiency for minority carriers generated by the altered region is different from that of an unaltered region. The collection efficiency for minority carriers is defined as the fraction of minority carriers generated by the instant electrons which are swept across the diode junction 302 when it is biased by an external circuit 304 to cause a signal current 306 to flow in the external circuit. Although FIG. 3 illustrates a preferred external circuit 304, it will be appreciated that this circuit is provided for purposes of example only.

In operation, the field emitters 308 and 310 emit narrow beams of electrons onto the surface of the diode 300. The incident electrons excite electron-hole pairs near the surface of the diode. Because the diode is reverse-biased by the external circuit 304, minority carriers that are generated by the incident electrons are swept toward the diode junction 302. Electrons that reach the junction 302 are then swept across the junction. Accordingly, minority carriers that do not recombine with majority carriers before reaching the junction are swept across the junction, causing a current flow in the external circuit 304.

Writing to diode 300 is accomplished by increasing the power density of the electron beam sufficiently to locally alter the physical properties of the diode. This alteration affects the number of minority carriers swept across the junction 302 when the same area is radiated with a lower power density (read) electron beam. For instance, the recombination rate in a written area 312 could be increased relative to an unwritten area 314 so that the minority carriers generated in the written area 312 have an increased probability of recombining with minority carriers before they have a chance to reach and cross the junction 302. Hence, a smaller current flows in the external circuit 304 when the "read" electron beam is incident upon a written area 312 than when it is incident upon an unwritten area 314. Conversely, it is also possible to start with a diode structure having a high recombination rate and to write bits by locally reducing the recombination rate. In such an embodiment, the magnitude of the current resulting from the minority carriers depends upon the state of the storage area and the output signal indicates the bit stored.

FIGS. 4A through 4C illustrate a preferred embodiment of a memory storage device 400 suitable for implementation with the present invention. FIG. 4A shows a side cross-sectional view of memory storage device 400 which includes a number of field emitters 402, a storage medium 404 that incorporates a number of storage areas 406, and a micromover 408 that scans the storage medium with respect to the field emitters or vice versa. In a preferred embodiment, each storage area 406 is responsible for storing one bit of information. As mentioned hereinbefore, the field emitters are responsible for reading and writing information on the storage areas by utilizing electron beams. Thus, field emitters suitable for the present invention preferably are of a type that produce electron beams which are narrow enough to achieve the desired bit density of the storage medium, and which provide the power density of the beam current needed for reading from and writing to the storage medium.

During operation, a predetermined potential difference is applied between a field emitter 402 and a corresponding gate, such as a circular gate 410, which surrounds the emitter. So provided, an electron beam current is extracted from the emitter 402 towards the storage area 406. Depending upon the distance between the emitters 402 and the storage medium 404, the type of emitters, and the spot size (e.g., bit size) required, electron optics may be useful in focusing the electron beams. Voltage also may be applied to the storage medium 404 to either accelerate or decelerate the emitted electrons or to aid in focusing the emitted electrons. A casing 412 also may be provided which maintains the storage medium 404 in a partial vacuum.

FIG. 4B depicts a top view of the memory storage device 400 and illustrates a two-dimensional array of storage areas 406 and a two-dimensional array of emitters 402. To reduce the number of external circuits, the storage medium 404 may be separated into rows, such as row 414, where each row contains a number of storage areas 406 whereby each emitter 402 may be responsible for a number of rows. However, in such an embodiment, each emitter 402 need not be responsible for entire lengths of the rows. Instead, the emitter 402 may be responsible for the storage areas 406 within rows 414 through 416, and within the columns 418 through 420. All rows of storage areas accessed by one emitter 402 typically are connected to one external circuit, for example, rows 414 through 416. To address a storage area 406, the emitter 402 responsible for that storage area is activated and is displaced with the micromover 408 (FIG. 4A) to that storage area.

Micromovers of various configurations may be utilized with the present invention provided that the micromover has sufficient range of movement and resolution to position the field emitters properly relative to the storage areas. As a conceptual example, and not for the purpose of limitation, a preferred micromover may be fabricated by a standard semiconductor microfabrication process to scan the storage medium in the X and Y directions.

FIG. 4C shows a top view of the cross-section 4C—4C of FIG. 4A and illustrates the storage medium 404 being held by two sets of thin-walled microfabricated beams 414 and 416, and 418 and 420. Faces of the first set of thin-walled beams, i.e., 414 and 416, are in the X-Z plane. This set of beams may be flexed in the X direction allowing the storage medium 404 to move in the X direction with respect to the casing 412. Faces of the second set of thin-walled beams, i.e., 418 and 420, are in the X-Z plane. This set of beams allows the storage medium 404 to move in the Y direction with respect to the casing 412. The storage medium is held by the first set of beams to a frame 422. The frame is held by the second set of beams to the casing 412. Thus, the field emitters may scan over the storage medium 404, or the storage medium may scan over the field emitters, in the X-Y directions by electrostatic, electromagnetic, piezoelectric or other suitable methods and/or mechanisms.

Referring now to FIG. 5, a preferred module 500 of the present invention will be described in greater detail. Module 500 includes a tip wafer 502 which includes a plurality of field emitters 504. As utilized herein, the term "wafer" refers to any substrate, platform or other suitable structure which is adapted for facilitating component placement and/or mounting. For instance, tip wafer 502 may be configured as a substrate, platform or other suitable structure which is adapted for facilitating placement and/or mounting of the emitters 504. In a preferred embodiment, however, the tip wafer is configured as a slab of material, i.e., the tip wafer incorporates a generally planar structure, which is formed, at least partially, of a conventional semiconductor substrate material, e.g., silicon. The emitters of the tip wafer 502 are arranged in proximity to a storage medium 506 of a mover wafer 508. Mover wafer 508 also includes various components, e.g., springs 510, among and in cooperation with other components, that are adapted to move the storage medium relative to the emitters. In other embodiments, the emitters may be configured to move relative to the storage medium, while the storage medium is retained in position.

A stator wafer 512 is provided which is arranged adjacent to the mover wafer and tip wafer (the mover wafer and tip wafer may be collectively referred to as ARS memory storage components). The stator wafer 512 incorporates various logic components and/or circuitry, such as system logic 514 and ARS control logic 516, so as to facilitate various functionalities of the module. For instance, the system logic 514 may facilitate functionality of a processor (e.g., a microprocessor) so that the module 500 may serve as a microprocessor device. Various other functionalities may be employed in other embodiments, such as those typically implemented by semiconductors. Additionally, ARS control logic 516 may facilitate functionality of the ARS memory storage components, thereby enabling reading of data from and writing of data to the storage medium.

In order to maintain the placement, e.g., spaced arrangement, and/or alignment of the various wafers of the module 500, a housing 517 is provided that at least partially encases the wafers. It should be noted, however, that various configurations not utilizing a housing may be utilized for maintaining proper positioning of the wafers relative to each other, thereby facilitating proper functioning of the various ARS memory storage components.

Intercommunication of the various wafers of the module 500 also may be provided in various configurations. Representative examples of transmission media, i.e., transmission medium 518 (enabling electrical communication of the stator wafer and the tip wafer), transmission medium 519 (enabling electrical communication of the tip wafer and the mover wafer), and transmission medium 520 (enabling electrical communication of the mover wafer and the stator wafer), are schematically depicted in FIG. 5. Additionally, transmission medium 522, may be configured for enabling electrical communication of the module 500 with components external to the module.

The module depicted in FIG. 5 may be utilized to facilitate instruction execution of systems, apparatuses, or devices, such as computer-based systems, processor-containing systems, or other systems that can fetch instructions and execute the instructions and/or otherwise manipulate data. Such instructions can be embodied in any computer-readable medium for use by or in connection with such instruction execution systems, apparatuses, or devices. In the context of this document, a "computer-readable medium" may be any means that contain, store, communicate, propagate or transport instructions for use by or in connection with an instruction execution system, apparatus, or device. The computer readable medium may be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). Note that the computer-readable medium could even be paper or other suitable medium upon which the instructions are printed, as the instructions can be electronically captured via, for instance, optical scanning of the paper or other medium, then compiled, interpreted, or otherwise processed in a suitable manner, if necessary, and then stored in memory.

Figure 6:
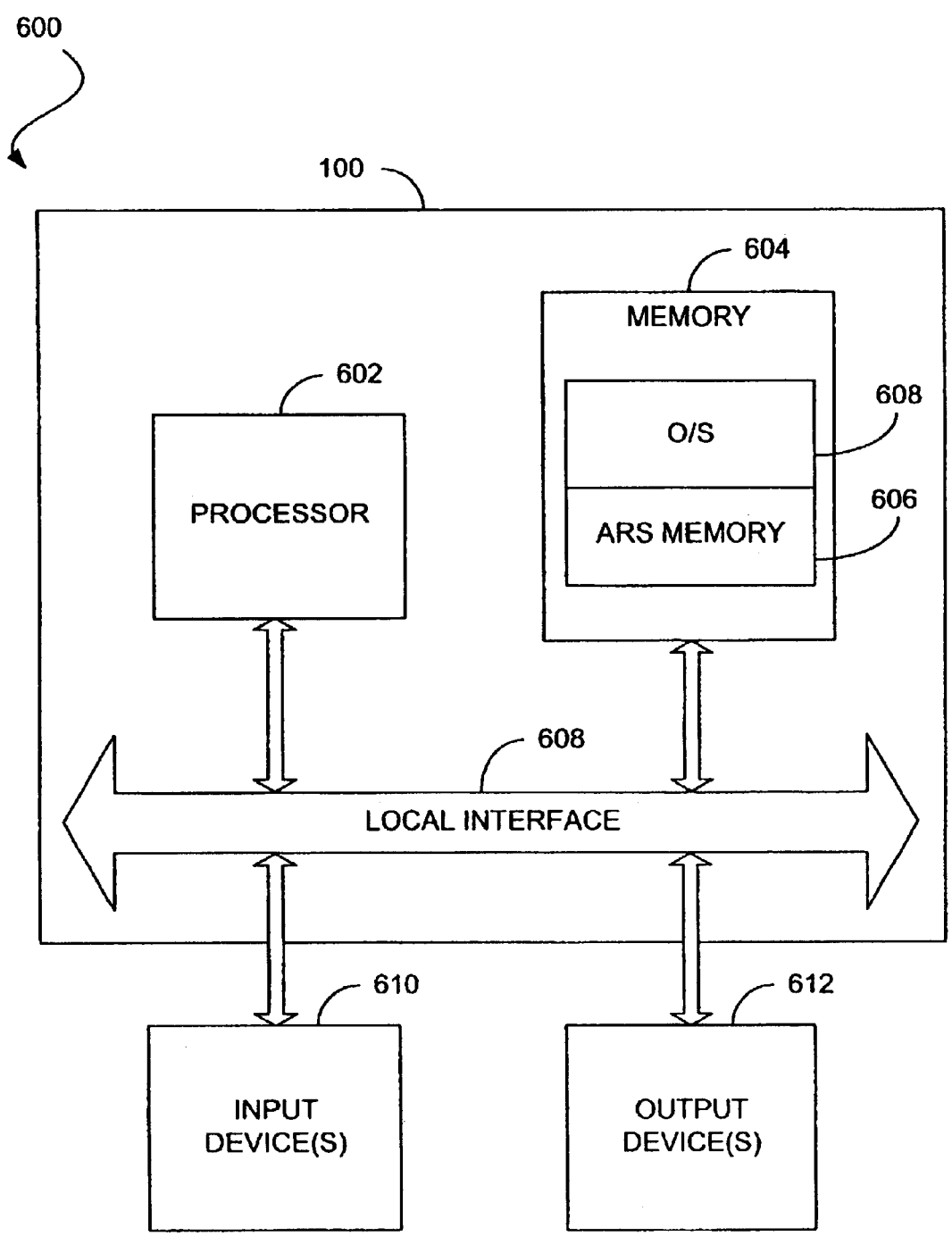
FIG. 6 is a schematic diagram illustrating a preferred embodiment of the present invention.

For example, and not for the purpose of limitation, FIG. 6 illustrates a computer or processor-based system 600 that may employ one or more modules 100 of the present invention. As shown in FIG. 6, computer system 600 may generally comprise a module 100 that includes a processor 602, which may be facilitated by system logic (described hereinbefore), and memory 604. Memory 604 incorporates ARS memory 606, which may be facilitated by ARS control logic (also described hereinbefore), and may include any combination of volatile and nonvolatile memory elements, such as random access memory or read only memory. Additionally, an operating system 608 is provided. So configured, the processor 602 accepts instructions and data from memory 604 over one or more interfaces, such as a bus or buses, for example. For instance, processor 602 may accept instructions and/or data from memory 604 via interface 608.

In some embodiments, the system 600 may include one or more input device(s) 610 and one or more output device(s) 612. Examples of input devices may include, but are not limited to, a serial port, a scanner, or a local access network connection. Examples of output devices may include, but are not limited to, a video display, a Universal Serial Bus, or a printer port. Generally, the system 600 may run any of a number of different platforms and operating systems, including, but not limited to, HP-ux™, Linux™, Unix™, Sun Solaris™ or Windows NT™ operating systems.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A module comprising:
   a first wafer having a storage medium, the storage medium having a plurality of storage areas, each of the storage areas being configurable in one of a plurality of structural states to represent information stored in the storage area;
   a second wafer arranged proximate the first wafer, the second wafer having a plurality of electron beam emitters configured to electrically communicate with the storage medium, said storage medium and said plurality of emitters being configured to move relative to each other such that each emitter may provide a beam of electrons to at least one of the storage areas of the storage medium, and
   logic circuitry configured to enable extraction of data from the storage areas of the storage medium and execution of instructions embodied within the data.

2. The module of claim 1, wherein the first and second wafers are semiconductor wafers.

3. The module of claim 1, further comprising:
   a housing at least partially encasing the first wafer and the second wafer, said housing being configured to maintain a spaced arrangement of the emitters of the second wafer and the storage areas of the first wafer.

4. The module of claim 1, wherein the first wafer has a micromover configured to move the storage medium relative to the emitters of the second wafer.

5. The module of claim 1, further comprising:
   a third wafer; and
   wherein said third wafer supports said logic circuitry.

6. The module of claim 5, wherein the second wafer and the third wafer are arranged on opposing sides of the first wafer.

7. A system comprising:
   a module having a plurality of semiconductor wafers, the plurality semiconductor wafers comprising:
      a storage medium having a plurality of storage areas, each of the storage areas being configurable in one of a plurality of structural states to represent information stored in the storage area;
      a plurality of electron beam emitters configured to electrically communicate with the storage medium, the storage medium and the plurality of emitters being configured to move relative to each other such that each emitter may provide a beam of electrons to at least one of the storage areas of the storage medium; and
      logic circuitry operative to extract data from the storage areas of the storage medium and execute instructions embodied in the data.

8. The system of claim 7, wherein the module further comprises:
   a housing at least partially encasing the plurality of semiconductor wafers, said housing being configured to maintain a spaced arrangement of the emitters and the storage areas.

9. The system of claim 7, wherein the module further comprises a micromover configured to move the storage medium relative to the emitters.

10. The system of claim 7, further comprising:
    an input device communicatively coupled to the module such that the input device is able to provide data to the module.

11. The system of claim 7, further comprising:
    an output device communicatively coupled to the module such that the output device is able to receive data from the module.

* * * * *